United States Patent
Park et al.

(10) Patent No.: US 10,701,283 B2
(45) Date of Patent: Jun. 30, 2020

(54) DIGITAL PHOTOGRAPHING APPARATUS AND METHOD OF CONTROLLING THE SAME

(71) Applicant: Samsung Electronics Co., Ltd., Gyeonggi-do (KR)

(72) Inventors: Il-Kwon Park, Gyeonggi-do (KR); Hyeong-chan Seo, Gyeonggi-do (KR); Sung-ki Jin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/779,923

(22) PCT Filed: Nov. 29, 2016

(86) PCT No.: PCT/KR2016/013833
§ 371 (c)(1),
(2) Date: May 30, 2018

(87) PCT Pub. No.: WO2017/111332
PCT Pub. Date: Jun. 29, 2017

(65) Prior Publication Data
US 2018/0376076 A1    Dec. 27, 2018

(30) Foreign Application Priority Data
Dec. 24, 2015    (KR) .................. 10-2015-0186784

(51) Int. Cl.
*H04N 5/265*    (2006.01)
*H04N 5/225*    (2006.01)
(Continued)

(52) U.S. Cl.
CPC .......... *H04N 5/265* (2013.01); *H04N 5/2258* (2013.01); *H04N 5/23232* (2013.01);
(Continued)

(58) Field of Classification Search
CPC .. H04N 5/265; H04N 9/04559; H04N 5/3415; H04N 5/23238; H04N 9/09;
(Continued)

(56) References Cited

U.S. PATENT DOCUMENTS 5,634,850 A    6/1997    Kitahara et al.
5,917,546 A    6/1999    Fukui
(Continued)

FOREIGN PATENT DOCUMENTS

CN    1110069 A    10/1995
CN    1989545 A    6/2007
(Continued)

OTHER PUBLICATIONS

International Search Report, dated: Feb. 23, 2017.
European Search Report dated Oct. 12, 2018.
Chinese Search Report dated Apr. 8, 2020.

*Primary Examiner* — Lin Ye
*Assistant Examiner* — Chan T Nguyen
(74) *Attorney, Agent, or Firm* — Cha & Reiter, LLC.

(57) ABSTRACT

The electronic apparatus includes: a plurality of image sensors including a first image sensor and a second image sensor; and a processor electrically connected to the plurality of image sensors and configured to output a read control signal and a synchronization signal to the plurality of image sensors, wherein the processor is further configured to: output a first read control signal to the first image sensor and receive first data read from the first image sensor; output a second read control signal to the second image sensor and store second data read from the second image sensor in a temporary memory; and output the second data stored in the temporary memory based on an output control signal generated between the first read control signal and a next first
(Continued)

read control signal and generate merged data in which the first data and the second data are merged.

15 Claims, 13 Drawing Sheets

(51) Int. Cl.
*H04N 9/09* (2006.01)
*H04N 5/232* (2006.01)
*H04N 5/341* (2011.01)
*H04N 9/04* (2006.01)
*H04N 13/243* (2018.01)
*H04N 13/106* (2018.01)
*H04N 13/239* (2018.01)

(52) U.S. Cl.
CPC ....... *H04N 5/23238* (2013.01); *H04N 5/3415* (2013.01); *H04N 9/04559* (2018.08); *H04N 9/09* (2013.01); *H04N 13/158* (2018.05); *H04N 13/239* (2018.05); *H04N 13/243* (2018.05)

(58) Field of Classification Search
CPC ............. H04N 13/243; H04N 5/23232; H04N 5/2258; H04N 13/239; H04N 13/158
USPC ........................................................ 348/239
See application file for complete search history.

(56) References Cited

U.S. PATENT DOCUMENTS

| 8,189,100 | B2 | 5/2012 | Li et al. |
| 8,558,929 | B2 | 10/2013 | Tredwell |
| 8,559,798 | B2 | 10/2013 | Aoki et al. |
| 9,001,227 | B2 | 4/2015 | Aleksic et al. |
| 2003/0222987 | A1 | 12/2003 | Karazuba et al. |
| 2008/0024596 | A1* | 1/2008 | Li ..................... H04N 5/2257 348/47 |
| 2008/0024614 | A1 | 1/2008 | Li et al. |
| 2009/0128854 | A1 | 5/2009 | Takei |
| 2010/0259798 | A1 | 10/2010 | Sakakibara et al. |
| 2011/0242342 | A1 | 10/2011 | Goma et al. |
| 2012/0081519 | A1* | 4/2012 | Goma .................. H04N 5/247 348/47 |
| 2013/0235149 | A1* | 9/2013 | Tanaka ............... H04N 5/23238 348/36 |
| 2015/0070530 | A1 | 3/2015 | Tanaka et al. |
| 2016/0012855 | A1* | 1/2016 | Krishnan ............ G11B 27/105 386/241 |

FOREIGN PATENT DOCUMENTS

| CN | 101584203 A | 11/2009 |
| CN | 102870401 A | 1/2013 |
| JP | 2003-230076 A | 8/2003 |
| JP | 2006-518147 A | 8/2006 |
| KR | 10-0388858 B1 | 10/2003 |
| KR | 10-0545903 B1 | 1/2006 |
| KR | 10-1512222 B1 | 4/2015 |

* cited by examiner

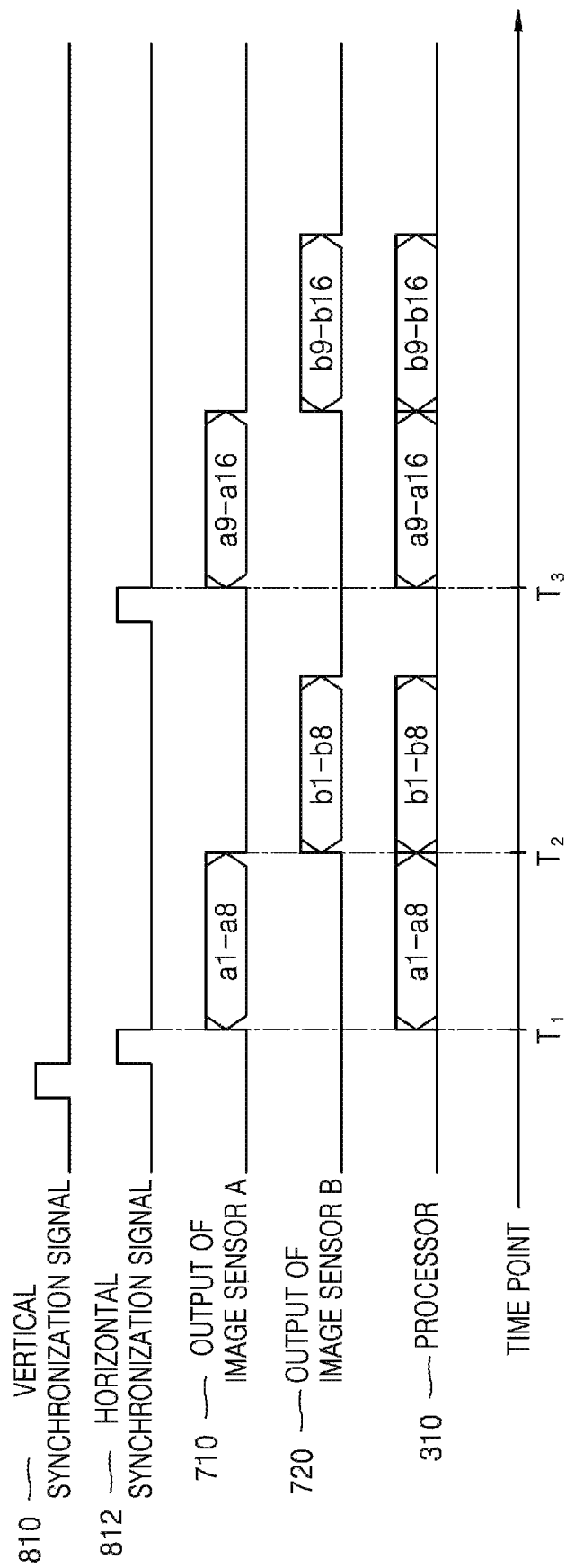

DIGITAL PHOTOGRAPHING APPARATUS AND METHOD OF CONTROLLING THE SAME

CLAIM OF PRIORITY

This application is a National Phase Entry of PCT International Application No. PCT/KR2016/013833, which was filed on Nov. 29, 2016 and claims a priority to Korean Patent Application No. 10-2015-0186784, which was filed on Dec. 24, 2015, the contents of which are incorporated herein by reference.

TECHNICAL FIELD

The present disclosure relates to an electronic apparatus and a method of controlling the electronic apparatus, and more particularly, to an efficient use of a memory by controlling a read time of an image signal generated by a plurality of image sensors.

BACKGROUND ART

An electronic apparatus may process an image obtained by an image sensor. Also, recent electronic apparatuses have reached the stage of mobile convergence encompassing the functionality of other apparatuses. Electronic apparatuses may provide a call function and a message exchange function, and may further provide a photographing function, etc., by including an image sensor.

The image sensor may convert received optical signals into electrical signals via pixels. The pixels may be arranged in a pixel array of a pre-set color pattern. For example, the pixels of the image sensor may include red (R), green (G), and blue (B) pixels, and the red (R), green (G), and blue (B) pixels may be arranged in the pixel array of the pre-set color pattern. Also, the pixels may be arranged in a pixel array of a color and brightness pattern. For example, the pixels of the image sensor may include red (R), green (G), blue (B), and white (W) pixels, and the red (R), green (G), blue (B), and white (W) pixels may be arranged in the pixel array of the pre-set color pattern.

A single image sensor or two or more image sensors may be provided in an electronic apparatus. The electronic apparatus may synthesize images captured by the two or more image sensors and generate one image.

DESCRIPTION OF EMBODIMENTS

Technical Problem

When photographing is performed by using a plurality of image sensors, and data read from the plurality of image sensors is stored or processed, an increased amount of hardware of an electronic apparatus is required to provide a temporary memory or a processing circuit based on the amount of data read from each image sensor, and the increased amount of hardware may increase overall expenses.

Thus, provided are an electronic apparatus and a method of controlling the electronic apparatus according to various embodiments. The electronic apparatus is configured to optimize a capacity of a temporary memory and efficiently form hardware, by adjusting read timings of data read from a plurality of image sensors.

Solution to Problem

According to an aspect of the present disclosure, an electronic apparatus includes: a plurality of image sensors including a first image sensor and a second image sensor; and a processor electrically connected to the plurality of image sensors and configured to output a read control signal and a synchronization signal to the plurality of image sensors, wherein the processor is further configured to: output a first read control signal to the first image sensor and receive first data read from the first image sensor; output a second read control signal to the second image sensor and store second data read from the second image sensor in a temporary memory; and output the second data stored in the temporary memory, based on an output control signal generated between the first read control signal and a next first read control signal, and generate merged data in which the first data and the second data are merged.

According to another aspect of the present disclosure, a method of controlling an electronic apparatus including a plurality of image sensors including a first image sensor and a second image sensor includes: outputting a first read control signal to the first image sensor and receiving first data read from the first image sensor, via a processor; outputting a second read control signal to the second image sensor and storing second data read from the second image sensor in a temporary memory; controlling the second data stored in the temporary memory to be output based on an output control signal generated between the first read control signal and a next first read control signal; and generating merged data in which the first data and the second data are merged.

According to another aspect of the present disclosure, a non-transitory recording medium has recorded thereon a program for executing the method of controlling the electronic apparatus.

Advantageous Effects of Disclosure

According to the embodiments, an electronic apparatus may efficiently store data read from a plurality of image sensors while having a minimum capacity of a temporary memory, and may generate a synthesized image.

BRIEF DESCRIPTION OF DRAWINGS

FIG. 13 is a view for describing a process of transmitting an image signal based on a synchronization signal of a processor, via an electronic apparatus, according to another embodiment.

MODE OF DISCLOSURE

Figure 1A:
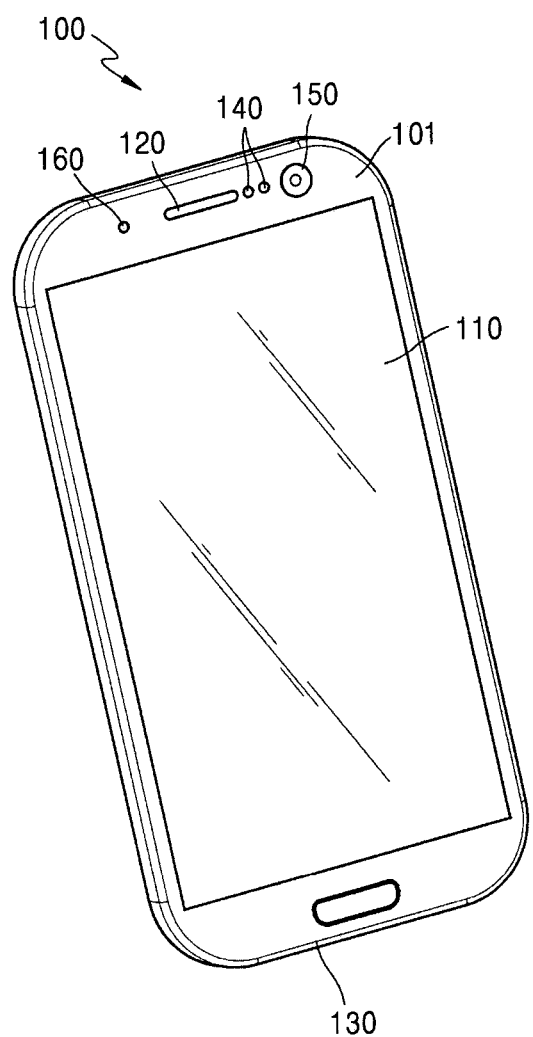
FIG. 1 is a view of an exterior shape of an electronic apparatus according to an embodiment.

Hereinafter, various embodiments will be described with reference to the accompanying drawings. However, the embodiments should not be construed as limiting the technical concept of the present disclosure, and it will be understood to encompass various modifications, equivalents, and/or alternatives. Regarding the description of the drawings, like reference numerals may refer to the like elements.

In the present disclosure, when a part "has," "may have," "includes," or "may include" an element, it is to be understood that the part includes the element (for example, a numeral value, a function, an operation, a component, or the like), while the part does not exclude other additional elements.

In the present disclosure, expressions, such as "A or B," "at least one of A and/or B," "one or more of A and/or B," etc., may include all possible combinations of arranged items. For example, expressions "A or B," "at least one of A and B," and "at least one of A or B" may refer to all of the cases (1) including at least one A, (2) including at least one B, and (3) including both at least one A and at least one B.

Expressions, such as "first," "second," etc., used in this disclosure may modify various components irrespective of an order and/or importance, and may be used to distinguish one element from other elements and should not be construed as limiting the components. For example, a first user device and a second user device may indicate different user devices, irrespective of an order or importance. That is, a first component may be referred to as a second component, and alternatively, a second component may be referred to as a first component, without departing from the scope of the present disclosure as defined by the claims.

When an element (for example, a first element) is "operatively or communicatively coupled with/to or connected to" another element (for example, a second element), it will be understood that the element may be directly coupled with/to or connected to the other element, or may be coupled with/to or connected to the other element via yet another element (for example, a third element). However, when an element (for example, the first element) is "directly connected to" or "directly coupled with/to" another element (for example, the second element), it will be understood that the element may be connected to or coupled with/to the other element without another element (for example, the third element) intervening therebetween.

A term used in the present disclosure "configured to" may be alternatively used as, for example, "suitable for," "having the capacity to," "designed to," "adapted to," "made to," or "capable of," depending on situations. The term "configured to" may not necessarily denote "specifically designed to" in a hardware manner. Rather, in some situations, an expression "a device configured to" may denote that the device is "capable of doing something" with other devices or components. For example, an expression "a processor configured to perform A, B, and C" may denote an exclusive processor (for example, an embedded processor) configured to perform the operations, or a generic-purpose processor (for example, a central processing unit (CPU) or an application processor (AP)) configured to perform the operations by executing one or more software programs stored in a memory device.

The terms used herein are for the purpose of describing particular embodiments only and are not intended to be limiting of the present disclosure. As used herein, the singular forms "a," "an" and "the" are intended to include the plural forms as well, unless the context clearly indicates otherwise. All terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art, and, unless clearly defined otherwise, will not be interpreted in an idealized or overly formal sense. Depending on cases, although some terms are defined in the present disclosure, they should not be interpreted to exclude embodiments of the present disclosure.

An electronic apparatus according to embodiments may include, for example, at least one of a smartphone, a tablet personal computer (PC), a mobile phone, a video phone, an electronic(e)-book reader, a desktop PC, a laptop PC, a netbook computer, a workstation, a server, a personal digital assistant (PDA), a portable multimedia player (PMP), an MP3 player, a mobile medical device, a camera, and a wearable device. According to embodiments, the wearable device may include at least one of an accessory-type wearable device (for example, a watch, a ring, a bracelet, an anklet, a necklace, glasses, contact lenses, or a head-mounted-device (HMD)), a fabric or clothing-integrated-type wearable device (for example, electronic clothing), a body-mounted-type wearable device (for example, a skin pad or tattoos), and a bio-implantable circuit-type wearable device.

In some embodiments, the electronic apparatus may include home appliances. The home appliances may include, for example, at least one of a television, a digital video disk (DVD) player, an audio player, a refrigerator, an air-conditioner, a vacuum cleaner, an oven, a microwave, a laundry machine, an air-cleaner, a set-top box, a home automation control panel, a security control panel, a TV box, a game console, an electronic dictionary, an electronic key, a camcorder, and an electronic frame.

According to other embodiments, the electronic apparatus may include at least one of: various medical devices (for example, various portable medical measuring devices (a blood sugar measuring device, a heartbeat measuring device, a blood pressure measuring device, a body-temperature measuring device, or the like), magnetic resonance angiography (MRA), magnetic resonance imaging (MRI), computed tomography (CT), ultrasonic devices, or the like); a navigation device; a global navigation satellite system (GNSS); an event data recorder (EDR); a flight data recorder (FDR); a vehicle infotainment device; electronic equipment for a ship (for example, a navigation device for a ship, a gyrocompass, etc.); an avionics device; a security device; a vehicle head unit; an industrial or a household robot; an automatic teller's machine of financial institutions; a point of sales of a store; and Internet of things (IoT) devices (for example, a bulb, various sensors, an electricity or gas meter, a sprinkler, a fire alarm, a thermostat, a streetlight, a toaster, sports equipment, a hot-water tank, a heater, a boiler, etc.).

In some embodiments, the electronic apparatus may include at least one of furniture, a part of a building/structure, an electronic board, an electronic signature receiving device, a projector, and various measuring devices (for example, waterworks, electricity, gas, and radio wave measuring devices). According to embodiments, the electronic apparatus may include a combination of one or more of the described apparatuses.

In some embodiments, the electronic apparatus may include a flexible electronic apparatus. Also, the electronic apparatus according to the present disclosure are not limited to the apparatuses described above, and may include new electronic apparatuses according to the development of technology.

Hereinafter, electronic apparatuses according to embodiments will be described by referring to the accompanying drawings. In this specification, a term "user" may refer to a person using an electronic apparatus, or an apparatus using an electronic apparatus, for example, an artificial intelligence (AI) electronic apparatus.

Figure 1B:
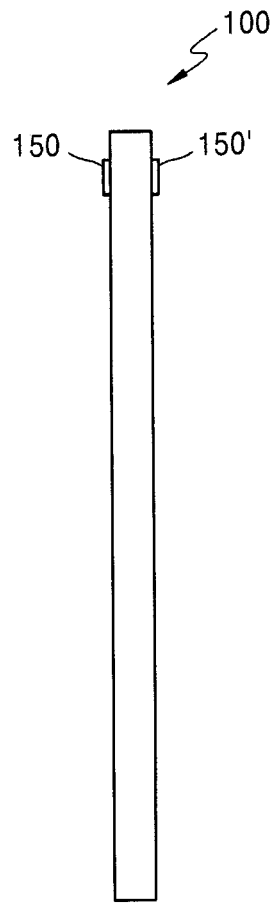

FIG. 1 is a view of an exterior shape of an electronic apparatus 100 according to an embodiment.

Referring to FIG. 1, the electronic apparatus 100 may be embodied as devices for various purposes. For example, the electronic apparatus 100 may be embodied, for example, as a cellular phone, a smartphone, a notebook computer, a tablet device, etc., as described above, but is not limited thereto.

Referring to (a) of FIG. 1, a display 110 may be mounted at a front surface 101 of the electronic apparatus 100. A speaker 120 configured to receive a voice of the other party may be mounted above the display 110. A microphone 103 configured to transmit a voice of a user of the electronic apparatus 100 may be mounted under the display 110.

According to an embodiment, components configured to perform various functions of the electronic apparatus 100 may be arranged around the speaker 120. The components may include at least one sensor module 140. The at least one sensor module 140 may include, for example, at least one of an illuminance sensor (for example, an optical sensor), a proximity sensor, an infrared sensor, and an ultrasonic sensor. The components may include a camera 150. According to an embodiment, the components may include a light-emitting diode (LED) indicator 160 configured to inform the user of information about a state of the electronic apparatus 100.

The electronic apparatus 100 may capture an object by using the camera 150. (b) of FIG. 1 is a side view of the electronic apparatus 100. Referring to (b) of FIG. 1, the electronic apparatus 100 may further include a camera 150'. However, the electronic apparatus 100 is not limited thereto, and may further include cameras. The cameras 150 and 150' of the electronic apparatus 100 may form various viewing angles. The viewing angles may include, for example, 30 degrees, 50 degrees, 90 degrees, and 180 degrees. The electronic apparatus 100 may generate images captured by the cameras 150 and 150' as separate images or may synthesize the captured images into one image. For example, when the cameras 150 and 150' have the viewing angles of 180 degrees, the electronic apparatus 100 may generate an image having a viewing angle of 360 degrees. A camera which may capture an image having the viewing angle of 360 degrees may be referred to as an omnidirectional camera or a 360 degrees camera. The electronic apparatus 100 according to embodiments is not limited to the omnidirectional camera or the 360 degrees camera, and may include a plurality of cameras or a camera capable of synthesizing a plurality of images captured by a plurality of image sensors.

Figure 2:
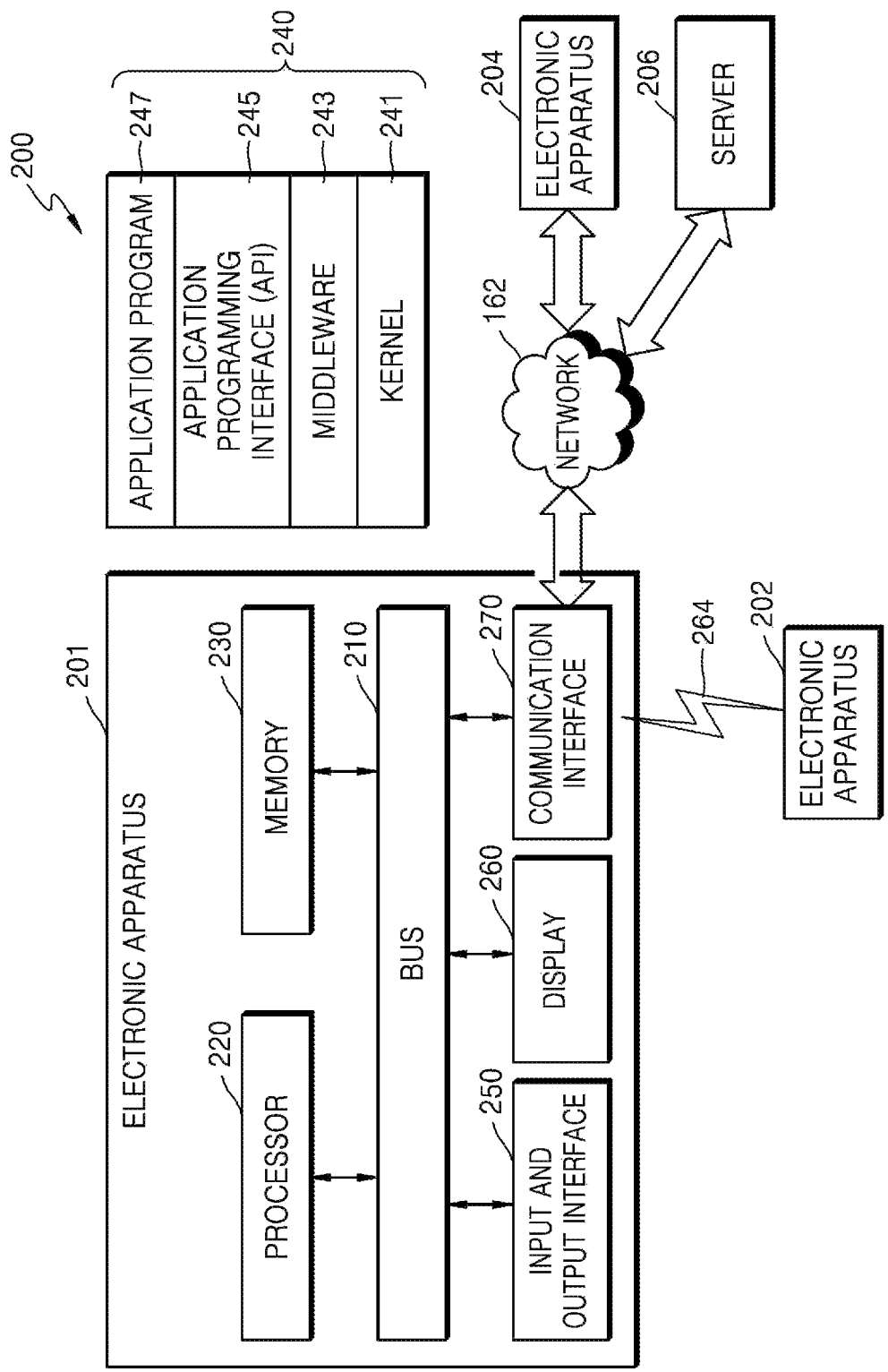
FIG. 2 is a diagram of an electronic apparatus in a network environment, according to embodiments.

FIG. 2 is a diagram of an electronic apparatus 201 in a network environment 200, according to various embodiments. The electronic apparatus 201 may include the electronic apparatus 100 of FIG. 1.

Referring to FIG. 2, the electronic apparatus 201 may include a bus 210, a processor 220, a memory 230, an input and output interface 250, a display 260, and a communication interface 270. In some embodiments, the electronic apparatus 201 may omit at least one of the components or may further include other components.

The bus 210 may interconnect the components 210 through 270, and may include a circuit to enable communication among the components 210 through 270, for example, the circuit to transmit a control message and/or data.

The processor 220 may include one or more of a CPU, an AP, a communication processor (CP), and an image signal processor. The processor 220 may perform calculation or data processing related to controlling and/or communication of one or more other components of the electronic apparatus 201.

The memory 230 may include a volatile and/or a nonvolatile memory. For example, the memory 230 may store a command or data related to one or more other components of the electronic apparatus 201. According to an embodiment, the memory 230 may store software and/or a program 240. The program 240 may include, for example, a kernel 241, middleware 243, an application programming interface (API) 245, and/or an application program (or "an application") 247. At least one of the kernel 241, the middleware 243, and the API 245 may be referred to as an operating system (OS).

For example, the kernel 241 may control or manage system resources (for example, the bus 210, the processor 220, the memory 230, or the like) used to execute operations or functions realized by other programs (for example, the middleware 243, the API 245, or the application program 247). Also, the kernel 241 may access separate components of the electronic apparatus 201 via the middleware 243, the API 245, or the application program 247, thereby providing an interface through which the system resources may be controlled or managed.

For example, the middleware 243 may perform an intervention function such that the API 245 or the application program 247 may communicate and exchange data with the kernel 241.

Also, the middleware 243 may process one or more operation requests received from the application program 247 according to a priority order. For example, the middleware 243 may assign, to at least one of the application programs 247, a priority order to use the system resource (for example, the bus 210, the processor 220, the memory 230, or the like) of the electronic apparatus 201. For example, the middleware 243 may process the one or more operation requests according to the priority order assigned to the at least one of the application program 247, and thus, may perform scheduling or load balancing with respect to the one or more operation requests.

For example, the API 245 may be an interface via which the application program 247 may control a function provided by the kernel 241 or the middleware 243. For example, the API 245 may include at least one interface or function (for example, an instruction) for controlling of a file, a window, or text, processing of an image, or the like.

For example, the input and output interface 250 may perform a function of an interface to transmit commands or data input from a user or other external apparatuses to (an)other component(s) of the electronic apparatus 201. Also, the input and output interface 250 may output commands or data received from the other component(s) of the electronic apparatus 201 to the user or other external apparatuses.

For example, the display 260 may include a liquid crystal display (LCD), an LED display, an organic LED (OLED) display, a microelectromechanical systems (MEMS) display, or an electronic paper display. For example, the display 260 may display to the user various content, for example, text, an image, a video, an icon, a symbol, or the like. The display 260 may include a touch screen. For example, the display 260 may receive a touch, a gesture, a proximity, or a hovering input using an electronic pen or part of a body of the user.

For example, the communication interface 270 may establish communication between the electronic apparatus 201 and an external apparatus (for example, a first external electronic apparatus 202, a second external electronic apparatus 204, or a server 206). For example, the communication interface 270 may be connected to a network 262 via wireless communication or wired communication and may communicate with the external apparatus (for example, the second external electronic apparatus 204 or the server 206).

The wireless communication may include, for example, a cellular communication protocol, and may include, for example, at least one of long-term evolution (LTE), LTE advance (LTE-A), code division multiple access (CDMA), wideband CDMA (WCDMA), a universal mobile telecommunication system (UMTS), wireless broadband (WiBro), and a global system for mobile communications (GSM). Also, the wireless communication may include, for example, short-range wireless communication 264. The short-range wireless communication 264 may include, for example, at least one of wireless fidelity (Wifi), Bluetooth, near field communication (NFC), and a global navigation satellite system (GNSS). The GNSS may include, for example, at least one of a global positioning system (GPS), a global navigation satellite system (Glonass), a Beidou navigation satellite system (hereinafter, "Beidou"), Galileo, and the European global satellite-based navigation system, based on a region of use or a bandwidth. Hereinafter, in this specification, the "GPS" may be interchangeably used with the "GNSS." The wired communication may include, for example, at least one of a universal serial bus (USB), a high definition multimedia interface (HDMI), recommended standard 232 (RS-232), and a plain old telephone service (POTS). The network 262 may include a telecommunications network. For example, the network 262 may include at least one of a computer network (for example, a local area network (LAN) or a wide area network (WAN)), the Internet, and a telephone network.

Each of the first and second external electronic apparatuses 202 and 204 may be the same apparatus as the electronic apparatus 201 or a different apparatus from the electronic apparatus 201. According to an embodiment, the server 206 may include a group of one or more servers. According to embodiments, all or part of operations executed by the electronic apparatus 201 may be executed by another electronic apparatus or a plurality of other electronic apparatuses (for example, the first and second external electronic apparatuses 202 and 204 or the server 206). According to an embodiment, when the electronic apparatus 201 is to perform a certain function or service automatically or in response to a request, the electronic apparatus 201 may request at least a function related to the certain function or service from the other electronic apparatuses (for example, the first and second external electronic apparatuses 202 and 204 or the server 206), additionally, or rather than the electronic apparatus 201 performs the certain function or service on its own. The other electronic apparatuses (for example, the first and second external electronic apparatuses 202 and 204 or the server 206) may perform the requested function or an additional function and may transmit a result of the performance to the electronic apparatus 201. The electronic apparatus 201 may provide the requested function or service by intactly providing the received result or by additionally processing the received result. To this end, for example, a cloud computing, a distributed computing, or a client-server computing technique may be used.

According to an embodiment, the electronic apparatus 201 and the first and second external electronic apparatuses 202 and 204 may transmit an image captured by a camera of each of the electronic apparatus 201 and the first and second external electronic apparatuses 202 and 204 to one electronic apparatus by using the described communication methods and may synthesize the images into one image. For example, an image having a viewing angle of 180 degrees, captured by the electronic apparatus 201, and an image having a viewing angle of 180 degrees, captured by the second external electronic apparatus 202, may be synthesized to generate an image having a viewing angle of 360 degrees.

Figure 3:
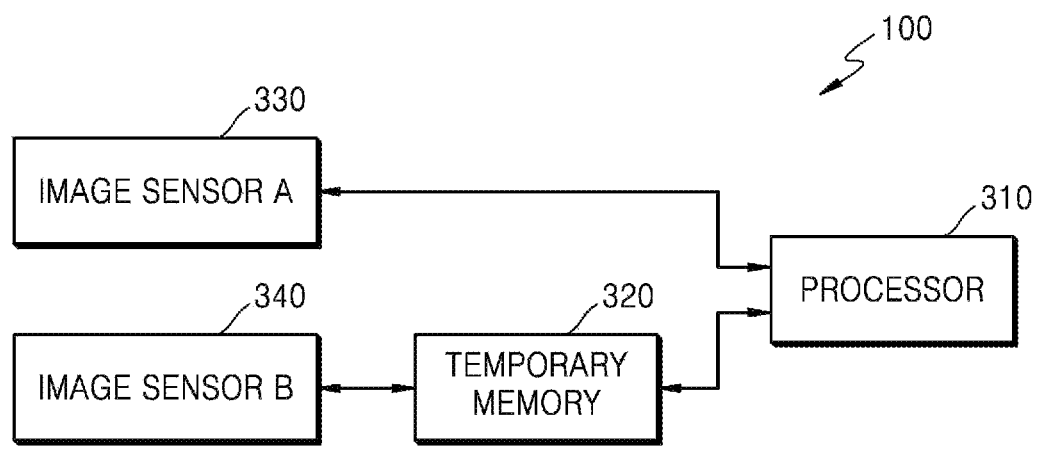
FIG. 3 is a schematic block diagram of the electronic apparatus illustrated in FIG. 1.

FIG. 3 is a schematic block diagram of the electronic apparatus 100 illustrated in FIG. 1.

Referring to FIG. 3, the electronic apparatus 100 may include a processor 310, a temporary memory 320, image sensor A 330, and image sensor B 340. Not all components illustrated in FIG. 3 are essential components of the electronic apparatus 100 according to an embodiment, and the electronic apparatus 100 may include more or less components than the components illustrated in FIG. 3. For example, the electronic apparatus 100 may include, for example, a touch panel, a physical key, a proximity sensor, and a biometric sensor, as an input module, and may include a memory, an analog/digital (ND) converter, a power supply, etc. Here, the processor 310 may denote a processor configured to control the image sensor A 330 and the image sensor B 330 and perform image processing by receiving image data.

The image sensor A 330 and the image sensor B 340 may receive light incident through a lens (not shown) and convert the light into an electrical signal. The image sensor A 330 may be referred to as a first image sensor and the image sensor B 340 may be referred to as a second image sensor. The first and second image sensors 330 and 340 may include a pixel sensor configured to sense at least two mixed colors information, for example, a white (w) pixel and a brightness pixel. For example, the first image sensor 330 and the second image sensor 340 may include a pixel array in which red (R), green (G), and blue (B), and white (W) pixel sensors are arranged in a set pattern.

The temporary memory 320 may temporarily store image signals generated and read from the second image sensor 340. The temporary memory 320 may be provided separately from the processor 310, and may include a buffer memory or a line memory. The image signals may be indicated and stored as a general data format transmitted between electronic apparatuses. The temporary memory 320 may temporarily store image signals read from only one of the two image sensors 330 and 340. As illustrated in FIG. 3, the image signal generated by the first image sensor 330 may be directly transmitted to the processor 310 without passing through the temporary memory 320, and the image signal generated by the second image sensor 340 may be temporarily stored in the temporary memory 320 and transmitted to the processor 310. The processor 310 may control the image signal stored in the temporary memory 320 to be received at a time point in which the reception of the image signal read from the first image sensor 330 is ended. The processor 310 must not receive a next image signal read from the first image sensor 330 while the processor 310 receives the image signal from the temporary memory 320, and thus, the processor 310 may insert a blanking period with respect to a read control signal output to the first image sensor 330, so as not to allow the image signals received from the first image sensor 330 and the second image sensor 340 to overlap each other. Aspects regarding the setting of the blanking period will be described below with reference to FIG. 8. The electronic apparatus 100 according to the present embodiment may realize the temporary memory 320 configured to store the image signals output from the two image sensors 330 and 340 via only a line memory corresponding to the image signal output from one image sensor, for example, data of one horizontal line, thereby reducing the number of line memories that are needed. Also, the electronic apparatus 100 may process the image signals input from the two image sensors 330 and 340 like an image signal input from one image sensor. In the case of a camera including a plurality of sensors or lenses, such as a three-dimensional (3D) camera, a dual camera, or a 360 degrees omnidirectional camera, using the electronic apparatus according to the present embodiment, exposure is precisely simultaneously started and ended, and thus, even if a quick object is captured, a user may conveniently obtain an effect of capturing the object via one sensor.

It is described that the electronic apparatus 100 according to the present embodiment includes the two image sensors 330 and 340. However, when the electronic apparatus 100 includes N (N is an integer equal to or greater than 2) image sensors, the electronic apparatus 100 may receive data by simultaneously or separately controlling the N image sensors based on a synchronization signal and a control signal, and may generate an image simultaneously merged, by using N−1 line memories.

The processor 310 may control operations of the described components. For example, the processor 310 may generate a synchronization signal so that an image signal is generated at a certain time point or at a certain time interval. The processor 310 may control generated image signals to be sequentially transmitted to the temporary memory 320. For example, after some of signals generated by the image sensor A 330 may be transmitted to the temporary memory 320, some of signals generated by the image sensor B 340 may be transmitted to the temporary memory 320.

The electronic apparatus 100 may additionally include an image processor (not shown) configured to process the image signals, or may have an image processor in the processor 310. Hereinafter, it is assumed that the processor 310 processes the image. The processor 310 may perform various post-processing by using the image signals received via the temporary memory 320. For example, the processor 310 may perform signal processing of gain adjustment or waveform standardization with respect to the received image signals.

The processor 310 may perform a process of removing noise with respect to the image signals. For example, the processor 310 may perform signal processing for image quality improvement, such as gamma correction, color filter array interpolation, color matrix, color correction, color enhancement, etc.

Figure 4:
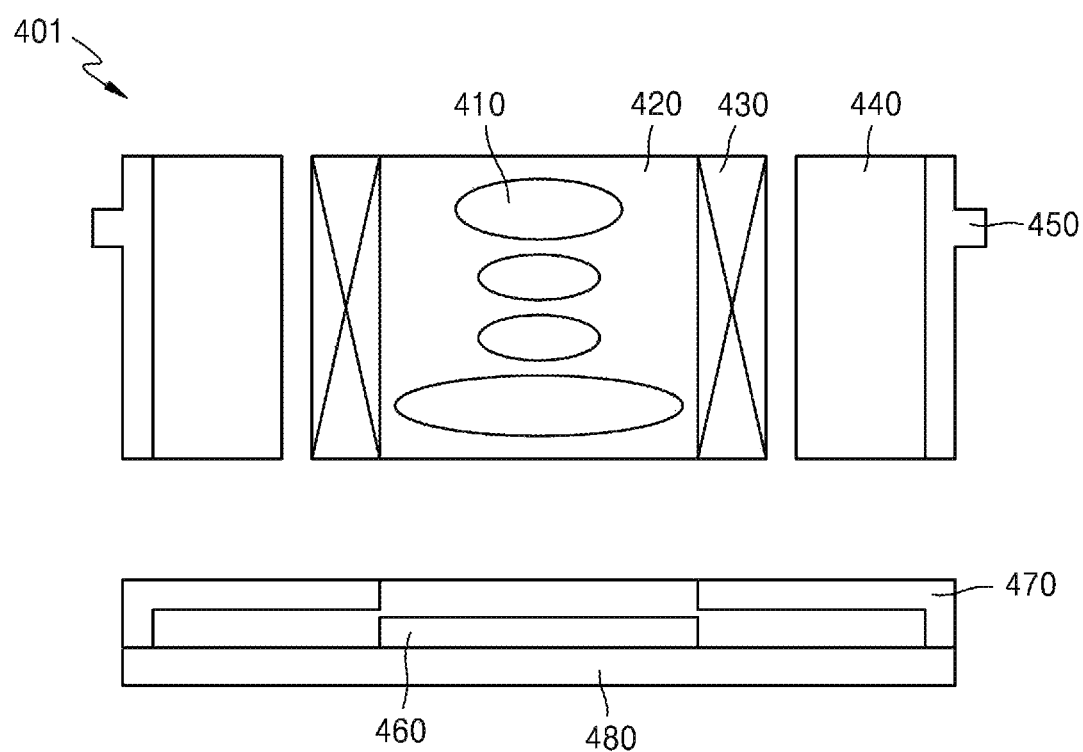
FIG. 4 is an example view for describing an image sensor module of the electronic apparatus illustrated in FIG. 1.

Each of the first and second image sensors 330 and 340 may be included in an image sensor module 401. FIG. 4 illustrates the image sensor module 401 of the electronic apparatus 100 according to an embodiment.

Referring to FIG. 4, the image sensor module 401 according to various embodiments may include a covering member 450, a lens 410, a lens barrel 420, a coil portion 430, a magnet portion 440, a base 470, an image sensor 460, and a circuit substrate 480.

The covering member 450 may form an exterior boundary of the image sensor module 401. The covering member 450 may protect various components arranged inside the image sensor module 401.

The lens 410 may include a plurality of lenses. For example, the plurality of lenses may include a lens moving for an auto-focus operation, a lens moving for a zooming operation, etc. An image obtained from the lens 410 may be transmitted to the image sensor 460.

The lens barrel 420 may receive the lens 410 therein. The coil portion 430 may be arranged at the outside of the lens barrel 420. The magnet portion 440 may be arranged at a location corresponding to the coil portion 430. The magnet portion 440 may be arranged to face the coil portion 430. According to embodiments, the electronic apparatus 100 may perform optical image stabilization with respect to user vibration, by moving the lens 410 based on interaction of electromagnetic fields or magnetic fields between the magnet portion 440 and the coil portion 430, by using an optical image stabilizer (OIS) driving module (not shown).

For example, the electronic apparatus 100 may move the lens 410, based on the interaction of the electromagnetic field generated from the coil portion 430 and the magnetic field generated from the magnet portion 440, when power is applied to the coil portion 430. Via this, the electronic apparatus 100 may sense hand-shaking of the user and move the lens 410 in a direction opposite to a direction of the hand-shaking, so as to prevent blurriness in images. The electronic apparatus 100 according to an embodiment may sense hand-shaking of the user and move the image sensor 460 in a direction opposite to a direction of the hand-shaking, so as to prevent blurriness in images.

The base 470 may be coupled to the covering member 450. The base 470 may support a bottom side of the covering member 450. An infrared prevention filter may further be arranged on the base 470 at a location thereof corresponding to the image sensor 460. The base 470 may operate as a sensor holder configured to protect the image sensor 460.

The image sensor 460 may be arranged on the circuit substrate 480. The image sensor 460 may be electrically connected to the circuit substrate 480 via wire-bonding or may be electrically connected to the circuit substrate 480 via flip bonding by using conductive pastes.

The circuit substrate 480 may include a plurality of circuit patterns (not shown) and may transmit, to the processor 310, a signal converted by using the image sensor 460.

Figure 5:
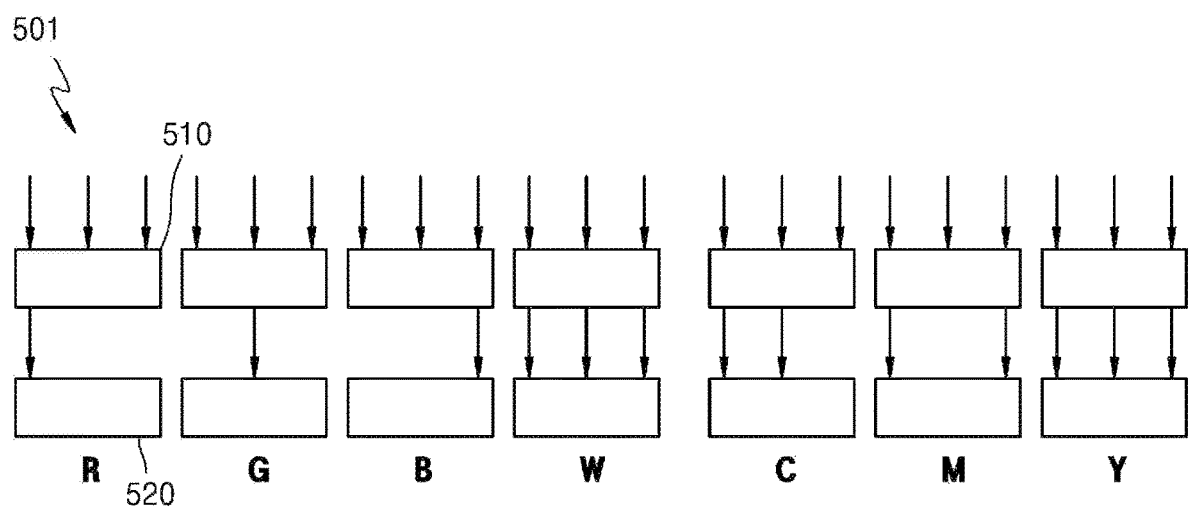
FIG. 5 is an example view for describing pixels included in an image sensor of the electronic apparatus illustrated in FIG. 1.

The image sensor 460 may include a pixel array in which color pixel sensors (for example, R, G, B pixels) and white pixels (for example, W pixels) are arranged in a set pattern. The pixel array may convert an optical image signal of an external object, which is incident through the lens 410, into an electric image signal. FIG. 5 illustrates pixels 501 included in an image sensor of an electronic apparatus according to embodiments.

As illustrated in FIG. 5, each of the pixels 501 may convert an optical signal into an electrical signal. Each of the pixels 501 may include at least one micro-lens (not shown), at least one color filter 510, and at least one photodiode 520.

The micro-lens may focus light incident from the outside.

The color filter 510 may include at least one of a red filter, a green filter, a blue filter, a white filter, a cyan filter, a magenta filter, and a yellow filter.

The photodiode 650 may convert an optical signal into an electrical signal.

Figure 6:
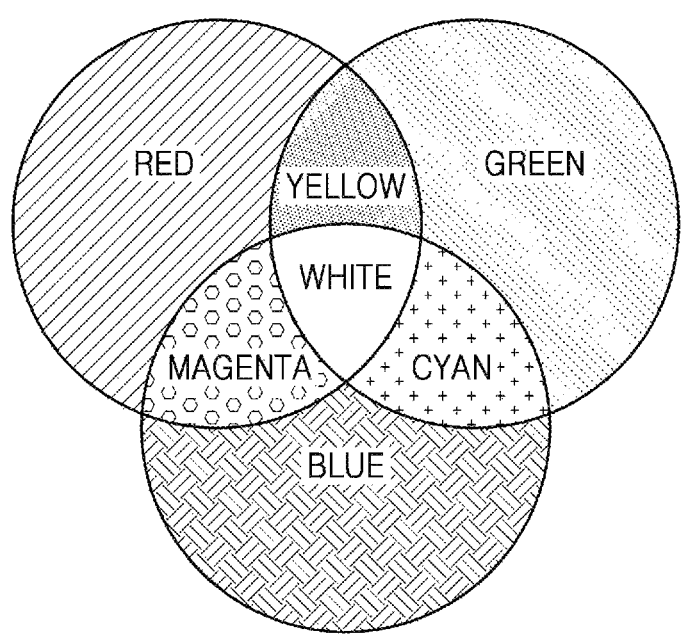
FIG. 6 is an example view for describing pixels included in the image sensor of the electronic apparatus illustrated in FIG. 1.

FIG. 6 is an example view for describing pixels included in an image sensor of an electronic apparatus according to embodiments.

As illustrated in FIGS. 5 and 6, the red filter may allow light of a red wavelength range to pass therethrough. The green filter may allow light of a green wavelength range to pass therethrough. The blue filter may allow light of a blue wavelength range to pass therethrough. The white filter may allow light of all visible wavelength ranges to pass therethrough. The cyan filter may allow light of the green wavelength range and the blue wavelength range to pass therethrough. The magenta filter may allow light of the red wavelength range and the blue wavelength range to pass therethrough. The yellow filter may allow light of the red wavelength range and the green wavelength range to pass therethrough.

Figure 7:
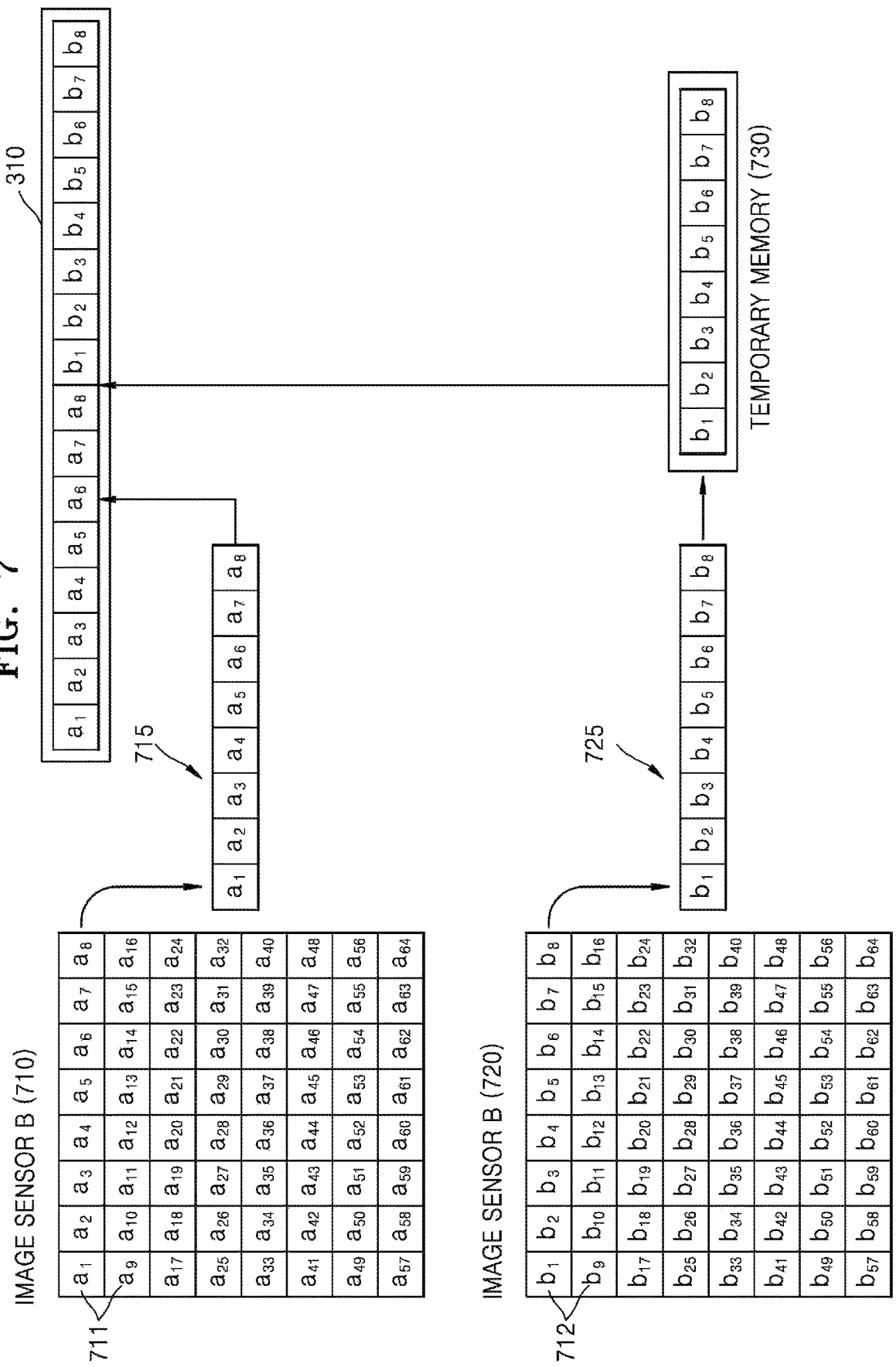
FIG. 7 is a view for describing a process of transmitting an image signal via an electronic apparatus, according to an embodiment.

FIG. 7 is a view for describing a situation in which an electronic apparatus transmits an image signal to a temporary memory 730, according to an embodiment. Hereinafter, it is assumed that image sensors include 8×8 pixels.

Referring to FIG. 7, the processor 310 may capture an object by controlling the image sensor module 401 illustrated in FIG. 4. The processor 310 may control a plurality of image sensors A and B 710 and 720 to substantially simultaneously capture the object by using a synchronization signal, etc. The image sensors A and B 710 and 720 may convert a received optical signal into an image signal. To this end, the image sensors A and B 710 and 720 may transmit a charge generated in each of pixels 711 and 721, that is, the optical signal, to the processor 310. In this case, the image signal read from the image sensor A 710 may be directly transmitted to the processor 310 and the image signal read from the image sensor B 720 may be transmitted to the temporary memory 730.

The image sensors A and B 710 and 720 may transmit the image signals to the processor 310 and the temporary memory 730 based on each line. In detail, the image sensor A 710 may transmit the image signal to the processor 310 from a first line 715. The image sensor B 720 may transmit the image signal to the temporary memory 730 from a first line 725. Accordingly, there is only a space in the temporary memory 730 to receive data of the first line 725 of the image sensor B 720, and thus, the received data may be smoothly output to the processor 310. The temporary memory 730 may output, to the processor 310, the data of the first line 725, the data being read from the image sensor B 720 and stored in the temporary memory 730 when the processor 310 finishes receiving the data of the first line 715, the data being read from the image sensor A 710. Thus, the electronic apparatus according to an embodiment may simultaneously receive, from the processor 310, the image signal read from each of the image sensors A and B 710 and 720, and generate a merged image, by including only one temporary memory, for example, only a line of the image sensor B 720, that is, the line memory configured to store data of 8 pixels. The processor 310 may not receive next image signals a9 through a16 from the image sensor A 710, while receiving the image signal from the temporary memory 730, and thus, may set a section before outputting a next horizontal synchronization signal or a next read control signal configured to control the image signal to be read from the image sensor A 710, as a blanking period.

A detailed process in which the image signals are transmitted to the processor 310 from the image sensors A and B 710 and 720 through the temporary memory 730 will be described below in FIG. 8.

The processor 310 may form one line by connecting the first line 715 received from the image sensor A 710 and the first line 725 received from the image sensor B 720. By repeating this process, the processor 310 may generate one image by synthesizing an image generated by the image sensor A 710 and an image generated by the image sensor B 720.

Figure 8:
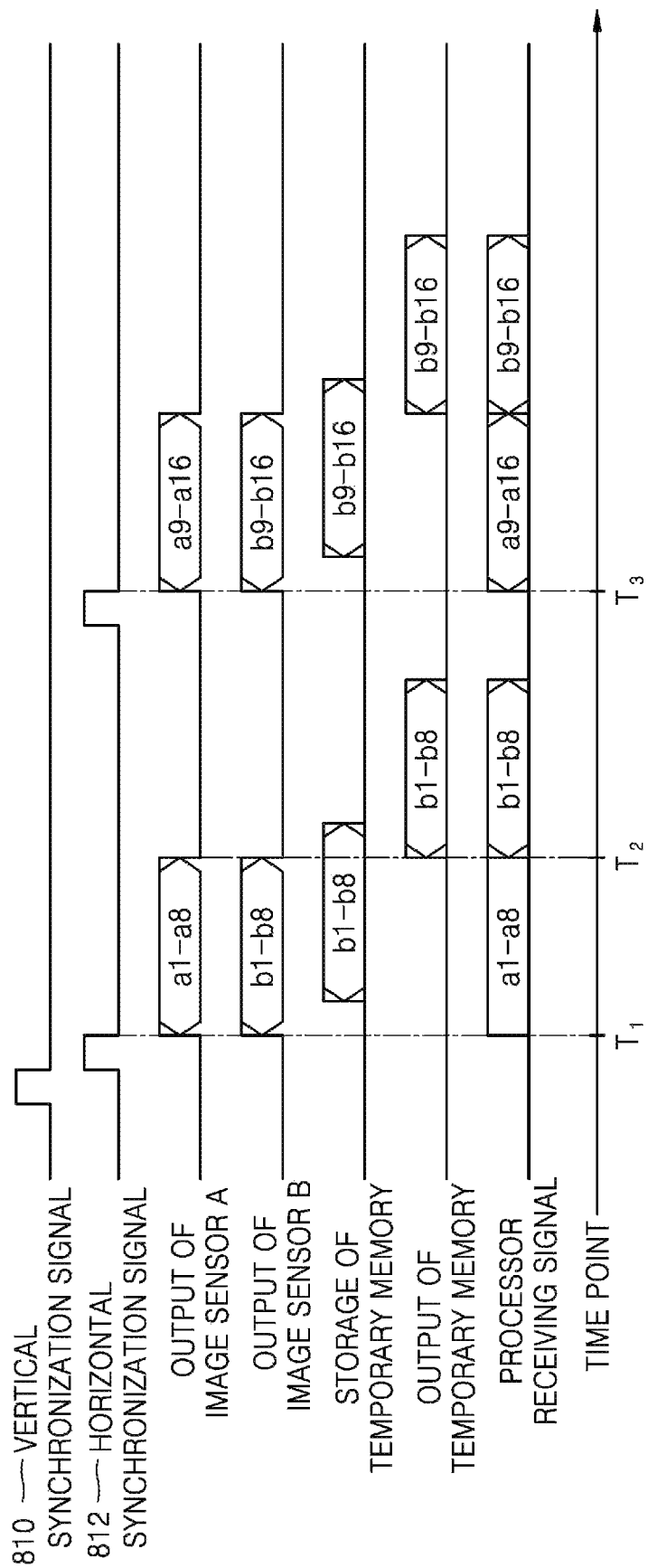
FIG. 8 is a view for describing a process of transmitting an image signal based on a synchronization signal of a processor, via an electronic apparatus, according to an embodiment.

FIG. 8 is a view for describing a process in which an electronic apparatus transmits an image signal based on a synchronization signal of the processor 310, according to an embodiment.

Referring to FIGS. 7 and 8, the processor 310 may control each of the image sensors A and B 710 and 720 by using a vertical synchronization signal 810 and a horizontal synchronization signal 812. The vertical synchronization signal 810 is configured to synchronize each of frames, and the horizontal synchronization signal 812 is configured to synchronize each of lines included in the frames. Here, the vertical synchronization signal 810 and/or the horizontal synchronization signal 812 may be a read control signal configured to control data to be read from each of the image sensors A and B 710 and 720. Here, the processor 310 may simultaneously or sequentially output the read control signals output to the image sensor A 710 and the image sensor B 720. Also, the processor 310 may synchronize or asynchronize the read control signals and output the read control signals to the image sensors A and B 710 and 720.

Based on the vertical synchronization signal 810 and the horizontal synchronization signal 812, the image sensor A 710 may transmit the image signal or data corresponding to the first line 715, to the processor 310.

At a time point T1, when the image sensor A 710 may output the data of the first line 715, the processor 310 may start to receive the data of the first line 715. In the same manner, the image sensor B 720 may output the data of the first line 725 to the temporary memory 730, and the data of the first line 725 may be sequentially stored in the temporary memory 730.

At a time point T2, the reception of the data from the image sensor A 710 may be ended, and the data in the temporary memory 730 may be output to the processor 310. Also, the processor 310 may control data a9 through a16 of a second line not to be received from the image sensor A 710 while receiving the data from the temporary memory 730. To this end, a timing of the horizontal synchronization signal 812 configured to control the reception of the data a9 through a16 of the second line from the image sensor A 710 may be controlled. That is, a section between the time point T2 in which the data is received from the temporary memory 730 and a time point T3 in which the data a9 through a16 of the second line is received from the image sensor A 710 may be set as a blanking period.

After the processor 310 receives all of the data from the image sensor B 720 through the temporary memory 730 after receiving all of the data from the image sensor A 710, the processor 310 may receive the data a9 through a16 of the second line from the image sensor A 710 in response to a next horizontal synchronization signal, and data b9 through b16 read from the image sensor B 720 may be stored again in the temporary memory 730. Then, the processor 310 may receive the data b9 through b16 stored in the temporary memory 730 at a time point when the processor 310 finishes receiving the data a9 through a16 from the image sensor A 710.

Accordingly, as described above, the processor 310 may smoothly receive the data output from the two image sensors A and B 710 and 720 by using only the line memory corresponding to one line of the image sensor B 720, by inserting a certain blanking period in a section in which the data received from the image sensor A 710 is read.

As described above in detail with reference to FIG. 7, the processor 310 may connect two lines, that is, horizontal lines of the imaging devices 710 and 720, into one line, when all of the data of the first line 715 of the image sensor A 710 and all of the data of the first line 725 of the image sensor B 720 are received. Also, the processor 310 may accumulate and merge all lines from the image sensors A and B 710 and 720 and may generate one image.

Figure 9:
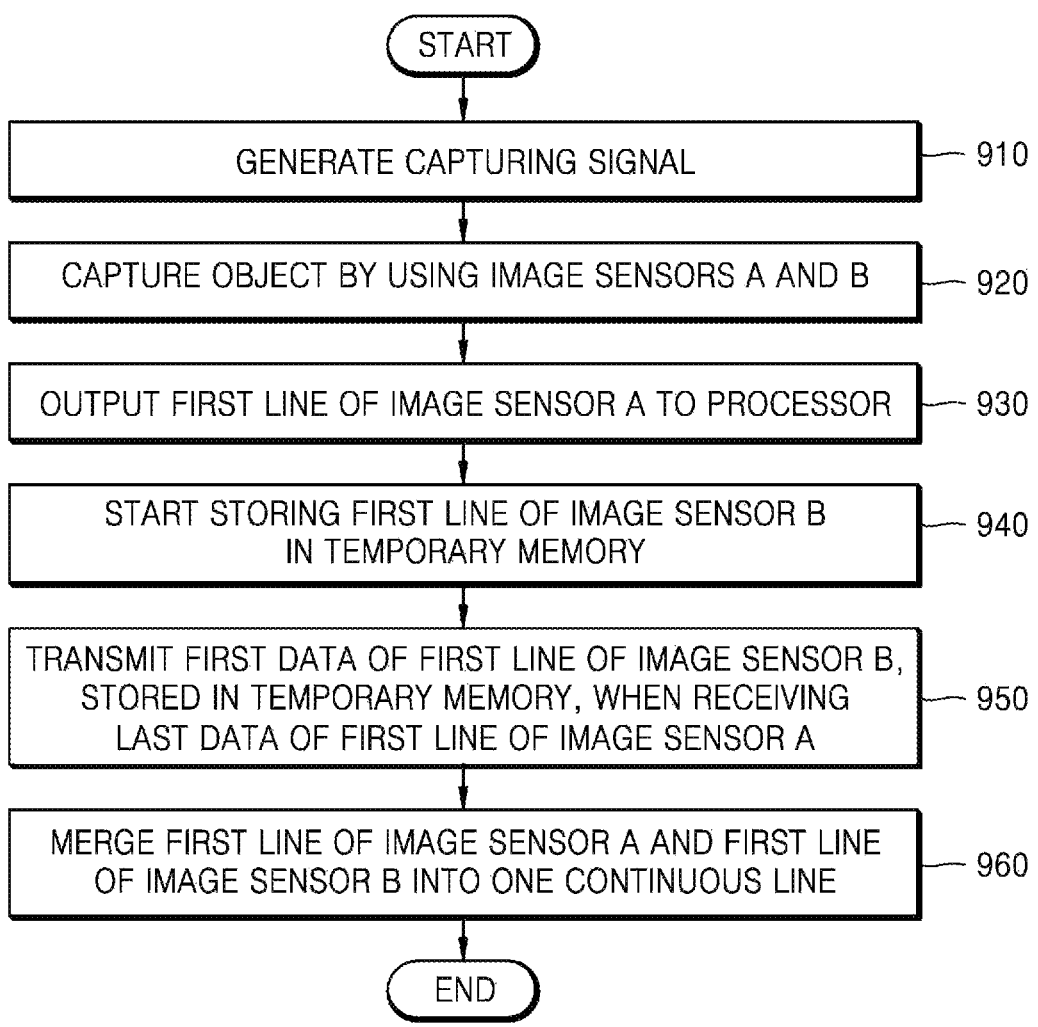
FIG. 9 is a flowchart of a method of controlling an electronic apparatus, according to another embodiment.

FIG. 9 is a flowchart of a method of controlling the electronic apparatus 100, according to another embodiment.

In operation S910, the electronic apparatus 100 may generate a capturing signal based on an event, such as a user input, etc. When the capturing signal is generated, the electronic apparatus 100 may capture an object by operating, for example, the image sensor module 401. In operation S920, the electronic apparatus 100 may capture the object by using the image sensor A 710 and the image sensor B 720.

In operation S930, the electronic apparatus 100 may directly transmit the first line 715 of the image sensor A 710 to the processor 310, without passing through the temporary memory 730.

In operation S940, the processor 310 may start to store the first line 725 of the image sensor B 720 in the temporary memory 730. Here, operations S930 and S940 may be simultaneously or time-sequentially performed.

In operation S950, when the processor 310 receives the last data of the first line 715 of the image sensor A 710, the first data of the first line 725 of the image sensor B 720, stored in the temporary memory 730, may be transmitted to the processor 310.

In operation S960, the processor 310 may merge the first line 715 of the image sensor A 710 and the first line 725 of the image sensor B 720 into one continuous line. The processor 310 may generate merged image data of one horizontal line, after receiving all of the data of the first lines 715 and 725 or the horizontal lines of the image sensor A 710 and the image sensor B 720. Also, selectively, the processor 310 may generate image data merged in a frame unit after receiving all of data of second and third lines after receiving all of the data of the first lines 715 and 725 or the horizontal lines of the image sensor A 710 and the image sensor B 720.

The electronic apparatus 100 may generate one synthesized image by repeating these operations with respect to the lines transmitted from the image sensors A and B 710 and 720.

According to the method of controlling the electronic apparatus 100, according to an embodiment, hardware may be formed by using only a temporary memory corresponding to one line of one image sensor with respect to the data read from a plurality of image sensors, and a timing of a synchronization signal of the image sensors may be adjusted so that the data read from the plurality of image sensors may be efficiently stored and a synthesized image may be generated, by having a minimum capacity of the temporary memory.

Figure 10A:
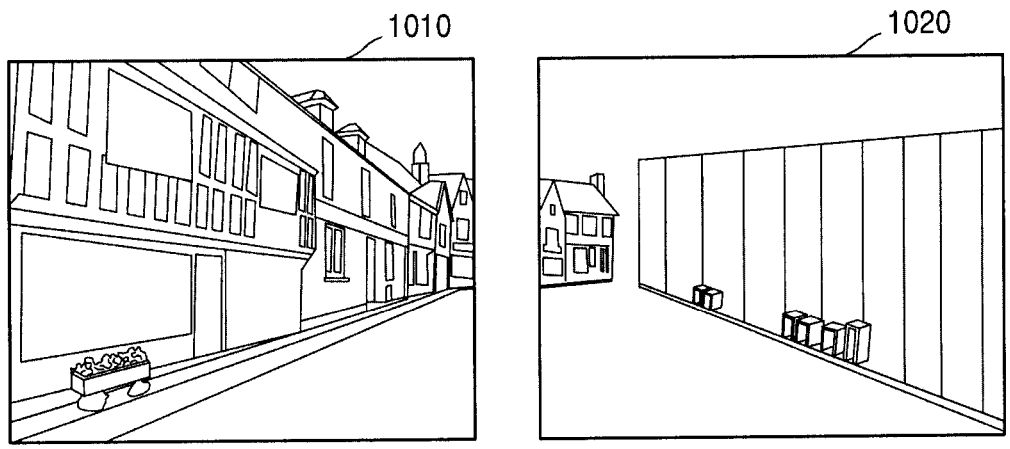
FIGS. 10 and 11 illustrate results of synthesizing a plurality of images into one image, via an electronic apparatus, according to an embodiment.
Figure 10B:
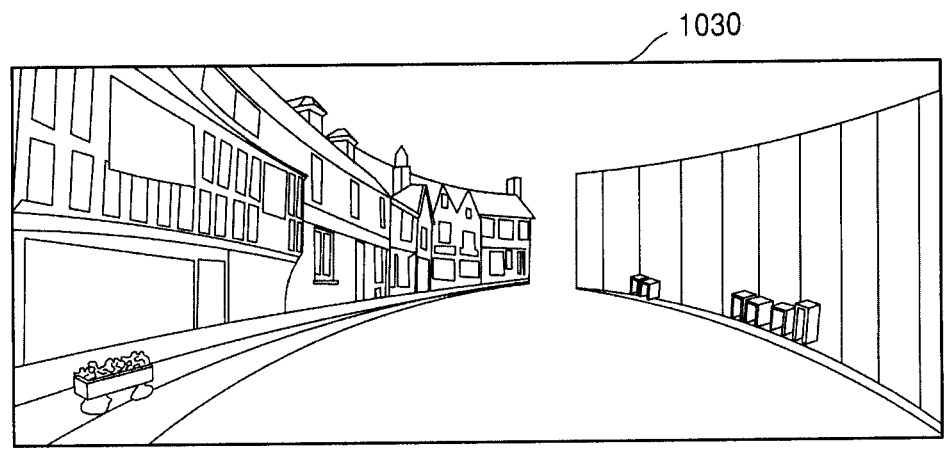

FIG. 10 is a view of a result of merging two images into one image via the electronic apparatus 100, according to an embodiment.

Referring to (a) of FIG. 10, image 1 1010 may be an image generated by the image sensor A 710. The image sensor A 710 may include, for example, an image sensor included in the camera 150 located at the front surface of the electronic apparatus 100 illustrated in FIG. 1. The image 1 1010 may include, for example, an image having a viewing angle of 180 degrees.

Image 2 1020 may include an image generated by the image sensor B 720. The image sensor B 720 may include, for example, an image sensor included in the camera 150' located at a surface opposite to the front surface of the electronic apparatus 100 of FIG. 1. The image 2 1020 may include an image having a viewing angle of 180 degrees.

Referring to (b) of FIG. 10, image 3 1030 may be an image generated by merging the image 1 1010 and the image 2 1020. Each of the image 1 1010 and the image 2 1020 has the viewing angle of 180 degrees, and thus, the image 1030 generated by merging the two images may have a viewing angle of 360 degrees.

When an object is captured by using the electronic apparatus 100 according to the present embodiment, a user may easily obtain an image having a viewing angle of 360 degrees via one time capturing.

Figure 11A:
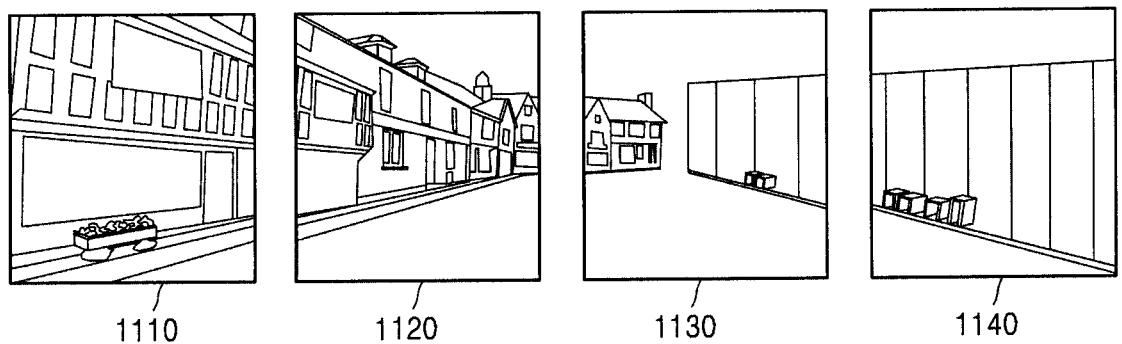
Figure 11B:
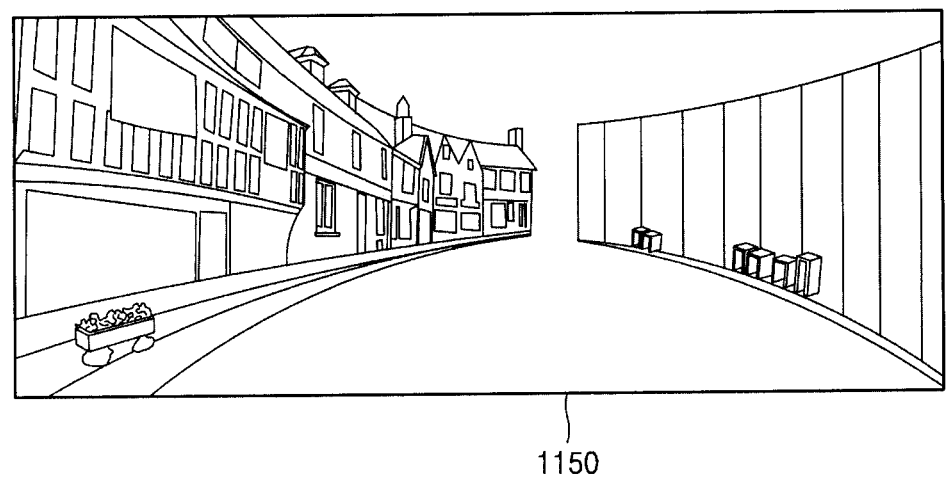

FIG. 11 is a view of a result of synthesizing four images into one image, via the electronic apparatus 100, according to an embodiment.

Referring to (a) of FIG. 11, image 1 1110 may be an image generated by a first image sensor, and may be, for example, an image having a viewing angle of 90 degrees. Image 2 1120 may be an image generated by a second image sensor, and may be, for example, an image having a viewing angle of 90 degrees. Image 3 1130 may be an image generated by a third image sensor, and may be, for example, an image having a viewing angle of 90 degrees. Image 4 1140 may be an image generated by a fourth image sensor, and may be, for example, an image having a viewing angle of 90 degrees.

Referring to (b) of FIG. 11, image 5 1150 may be an image generated by merging the image 1 1310, the image 2 1320, the image 3 1330, and the image 4 1340. Each of the images has the viewing angle of 90 degrees, and thus, the image 5 1150 in which the images are merged may have a viewing angle of 360 degrees.

When an object is captured by using the electronic apparatus 100 according to the present embodiment, a user may easily obtain an image having a viewing angle of 360 degrees via one time capturing.

Figure 12:
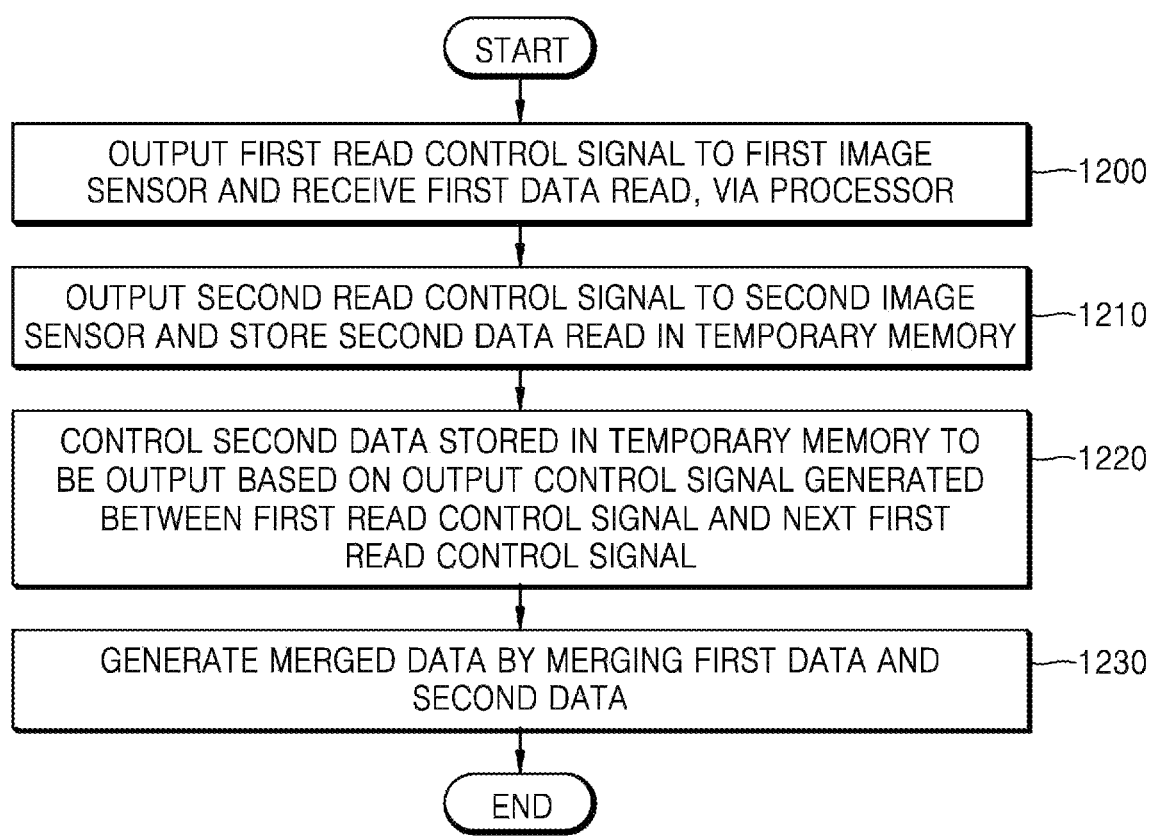
FIG. 12 is a flowchart of a method of controlling an electronic apparatus, according to another embodiment.

FIG. 12 is a flowchart of a method of controlling an electronic apparatus, according to another embodiment.

Referring to FIG. 12, in operation S1200, a processor may output a first read control signal to a first image sensor and receive first data that is read.

In operation S1210, the processor may output a second read control signal to a second image sensor and store second data that is read in a temporary memory.

Operations S1200 and S1210 may be simultaneously or sequentially performed. The first read control signal and the second read control signal may be horizontal synchronization signals or sensor control signals corresponding to the horizontal synchronization signals, output to the image sensors.

In operation S1220, the processor may control the second data stored in the temporary memory to be output based on an output control signal generated between the first read control signal and a next first read control signal. Here, a blanking period may be inserted between the first read control signal for reading data of a first line of the first image sensor and the next first read control signal for reading data of a second line of the first image sensor. Thus, the processor may receive the second data stored in the temporary memory after receiving the first data from the first image sensor, and may not receive the data from the first image sensor while receiving the second data. A length of the blanking period may be variably set by taking into account the number of image sensors, a size of one line of the image sensors, etc.

In operation S1230, the processor may generate merged data in which the first data and the second data are merged.

According to the method of controlling the electronic apparatus according to an embodiment, only by setting a certain blanking period with respect to a data read timing of a certain sensor of the plurality of image sensors, the use of the temporary memory may be minimized, and even if a data input clock and a data output clock are the same, it may not be inconvenient for the processor to synthesize a plurality of pieces of image data.

FIG. 13 is a view for describing a situation in which an electronic apparatus transmits an image signal to a temporary memory, according to another embodiment. Compared with the embodiment of FIG. 8, the electronic apparatus according to the embodiment of FIG. 13 does not include an additional temporary memory. Here, read timings of the image sensor A 710 and the image sensor B 720 may be adjusted so that the image sensor A 710 and the image sensor B 720 may sequentially output data to the processor 310 without a temporary memory.

Referring to FIG. 13, the processor 310 may control the image sensors A and B 710 and 720 by using the vertical synchronization signal 810 and the horizontal synchronization signal 812.

Ata time point T1, when the image sensor A 710 outputs data a1 through a8 of the first line 715, the processor 310 may start to receive the data a1 through a8 of the first line 715. Data b1 through b8 of the first line 725 of the image sensor B 720 may be started to be output to the processor 310, at a timing in which the processor 310 finishes receiving the data a1 through a8 of the first line 715. That is, the sensor output timings of the image sensor A 710 and the image sensor B 720 may have a difference between the time point T2 and the time point T1. Also, the processor 310 may control the data not to be received from the image sensor A 710, while receiving the data b1 through b8 from the image sensor B 720. To this end, the processor 310 may control a timing of the horizontal synchronization signal 812 configured to control receiving data a9 through a16 of a second line from the image sensor A 710. That is, a blanking period may be set between the time point T2 in which the data is received from the temporary memory 730 and a time point T3 in which the data a9 through a16 of the second line is received from the image sensor A 710.

The processor 310 may receive the data a9 through a16 of the second line from the image sensor A 710 in response to a next horizontal synchronization signal, after receiving all of the data b1 through b8 from the image sensor B 720 after receiving all of the data a1 through a8 from the image sensor A 710. Also, the processor 310 may receive data b9 through b16 of a next line from the image sensor B 720 at a time point when the processor 310 finishes receiving the data a9 through a16 from the image sensor A 710.

Accordingly, as described above, the processor 310 may control the data read timings of the image sensor A 710 and the image sensor B 720 to be different, and may set a certain blanking period with respect to the read control signal of the image sensor A 710, so as to receive the data from the image sensor A 710 and the image sensor B 720 in a non-overlapped manner and generate image data simultaneously merged, without using a temporary memory.

At least one of apparatuses (for example, modules or functions thereof) and methods (for example, operations) according to embodiments may be implemented as computer instructions which may be executed by various computer means, and recorded on a non-transitory computer-readable recording medium. When the instructions are executed by a processor (for example, the processor 310), one or more processors may perform functions corresponding to the instructions. The non-transitory computer-readable recording medium may include, for example, the memory 130.

The non-transitory computer-readable recording medium may include a hard disk, a floppy disk, magnetic media (e.g., magnetic tapes), optical media (e.g., compact disc-read only memories (CD-ROMs), or digital versatile discs (DVDs)), magneto-optical media (e.g., floptical disks), and hardware devices (e.g., read only memory (ROM), random access memory (RAM), or flash memories). Examples of the program commands include a high-level programming language code that may be executed by a computer using an interpreter as well as a machine language code made by a complier. The hardware devices may be configured to operate as one or more software modules to perform operations according to various embodiments, and vice versa.

Modules or program modules according to various embodiments may include or omit at least one of the described components, and may further include other components. Operations performed by the modules, the program modules, or other components according to the embodiments may be performed in a sequential, parallel, repeated, or heuristic method. Also, some of the operations may be performed in different orders or omitted, and other operations may be added. The scope of the present disclosure is indicated by the claims rather than by the detailed description of the disclosure, and it should be understood that the claims and all modifications or modified forms drawn from the concept of the claims are included in the scope of the present disclosure.

The invention claimed is:

1. An electronic apparatus comprising:
   a plurality of image sensors comprising a first image sensor and a second image sensor; and
   a processor electrically connected to the plurality of image sensors and configured to output a read control signal and a synchronization signal to the plurality of image sensors,
   wherein the processor is further configured to:
   output a first read control signal to the first image sensor and directly receive first data read from the first image sensor;
   output a second read control signal to the second image sensor and store second data read from the second image sensor in a temporary memory; and
   output the second data stored in the temporary memory, based on an output control signal generated between the first read control signal and a next first read control signal, and generate merged data in which the first data received directly from the first image sensor and the second data output from the temporary memory are merged.

2. The electronic apparatus of claim 1, wherein the temporary memory is mounted in the electronic apparatus, separately from the processor.

3. The electronic apparatus of claim 1, wherein the first data comprises data generated in a horizontal axis line of pixels comprised in the first image sensor, and the second data comprises data generated in a horizontal axis line of pixels comprised in the second image sensor;
the temporary memory comprises a space to store a size of data corresponding to the second data; and
the processor is further configured to merge the first data and the second data into one horizontal axis line.

4. The electronic apparatus of claim 1, wherein the processor is further configured to
control the second data stored in the temporary memory to be output in correspondence to a timing when the receiving of the first data is ended, and
insert a blanking period between the first read control signal and the next first read control signal.

5. The electronic apparatus of claim 1, wherein the first image sensor is comprised in a first image sensor module having a viewing angle of 180 degrees and the second image sensor is comprised in a second image sensor module having a viewing angle of 180 degrees, and
the processor is further configured to generate an image having a viewing angle of 360 degrees by merging an image generated by the first image sensor module and an image generated by the second image sensor module.

6. The electronic apparatus of claim 1, wherein the temporary memory comprises N−1 line memories, when a number of the plurality of sensors is N (here, N is an integer equal to or greater than 2).

7. The electronic apparatus of claim 1, wherein a speed in which the second data stored in the temporary memory is output in response to the output control signal is equal to a speed in which the first and second data is read from the plurality of image sensors in response to the first and second read control signals.

8. The electronic apparatus of claim 1, wherein the processor is further configured to output the first and second read control signals to the first and second image sensors, respectively, simultaneously, or time-sequentially.

9. A method of controlling an electronic apparatus comprising a plurality of image sensors comprising a first image sensor and a second image sensor, the method comprising:
outputting a first read control signal to the first image sensor and receiving first data read directly from the first image sensor, via a processor;
outputting a second read control signal to the second image sensor and storing second data read from the second image sensor in a temporary memory;
controlling the second data stored in the temporary memory to be output based on an output control signal generated between the first read control signal and a next first read control signal; and
generating merged data in which the first data received directly from the first image sensor and the second data output from the temporary memory are merged.

10. The method of claim 9, wherein the first data comprises data generated in a horizontal axis line of pixels comprised in the first image sensor, and the second data comprises data generated in a horizontal axis line of pixels comprised in the second image sensor;
the temporary memory comprises a space to store a size of data corresponding to the second data; and
the generating of the merged data comprises merging the first data and the second data into one horizontal axis line.

11. The method of claim 9, further comprising:
controlling the second data stored in the temporary memory to be output in correspondence to a timing when the receiving of the first data is ended, based on the output control signal.

12. The method of claim 10, further comprising:
inserting a blanking period between the first read control signal and the next first read control signal.

13. The method of claim 9, wherein the first image sensor is comprised in a first image sensor module having a viewing angle of 180 degrees and the second image sensor is comprised in a second image sensor module having a viewing angle of 180 degrees,
the method further comprising:
generating an image having a viewing angle of 360 degrees by merging an image generated by the first image sensor module and an image generated by the second image sensor module.

14. The method of claim 9, wherein the temporary memory comprises N−1 line memories, when a number of the plurality of sensors is N (here, N is an integer equal to or greater than 2), and
a speed in which the second data stored in the temporary memory is output in response to the output control signal is equal to a speed in which the first and second data is read from the plurality of image sensors in response to the first and second read control signals.

15. A non-transitory recording medium having recorded thereon a program for executing the method of claim 9 on a computer.

* * * * *